(12) United States Patent
Barrington et al.

(10) Patent No.: US 9,128,959 B2
(45) Date of Patent: *Sep. 8, 2015

(54) CROWDSOURCED SEARCH AND LOCATE PLATFORM

(71) Applicant: DigitalGlobe, Inc., Longmont, CO (US)

(72) Inventors: Luke Barrington, San Diego, CA (US); Nathan Ricklin, San Diego, CA (US); Shay Har-Noy, San Diego, CA (US)

(73) Assignee: DigitalGlobe, Inc., Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/049,199

(22) Filed: Oct. 8, 2013

(65) Prior Publication Data

US 2014/0233863 A1    Aug. 21, 2014

Related U.S. Application Data

(63) Continuation of application No. 13/841,392, filed on Mar. 15, 2013, now abandoned, and a continuation-in-part of application No. 14/010,450, filed on Aug. 26, 2013, which is a continuation of application No. 13/839,379, filed on Mar. 15, 2013, now abandoned.

(60) Provisional application No. 61/766,673, filed on Feb. 19, 2013, provisional application No. 61/766,644, filed on Feb. 19, 2013.

(51) Int. Cl.
| | |
|---|---|
| *G06Q 30/02* | (2012.01) |
| *G06Q 10/10* | (2012.01) |
| *G06Q 10/06* | (2012.01) |
| *G06Q 30/06* | (2012.01) |
| *G06Q 10/08* | (2012.01) |
| *G06F 17/30* | (2006.01) |

(52) U.S. Cl.
CPC .... *G06F 17/30268* (2013.01); *G06F 17/30241* (2013.01); *G06Q 10/103* (2013.01)

(58) Field of Classification Search
CPC ...................................................... G06Q 10/103
USPC ................................................... 705/1.1–912
See application file for complete search history.

(56) References Cited

U.S. PATENT DOCUMENTS

| | | | |
|---|---|---|---|
| 8,379,913 B1* | 2/2013 | Robinson et al. | 382/100 |
| 8,620,532 B2* | 12/2013 | Curtis et al. | 701/50 |
| 2007/0162761 A1* | 7/2007 | Davis et al. | 713/182 |

(Continued)

*Primary Examiner* — Jonathan Ouellette
(74) *Attorney, Agent, or Firm* — Galvin Patent Law LLC; Brian R. Galvin

(57) ABSTRACT

A crowdsourced search and locate platform, comprising an application server and a client interface application. The application server: receives connections from crowdsourcing participants; navigates a first crowdsourcing participant to a specific geospatial location; sends an image corresponding to the geospatial location to the first crowdsourcing participant; receives tagging data from the first crowdsourcing participant, the tagging data corresponding to a plurality of objects and locations identified by the first crowdsourcing participant. The client interface application: displays elements enabling an administrative user to configure a crowdsourced search and locate campaign; displays other elements enabling an administrative user to configure and run a crowdrank algorithm; and upon the user's selecting a particular object type icon, displays tags of the type selected by placing visual indicators at each tagged location of objects of the selected type within the plurality of image strips.

2 Claims, 10 Drawing Sheets

(56) References Cited

U.S. PATENT DOCUMENTS

| | | |
|---|---|---|
| 2012/0284090 A1 | 11/2012 | Marins et al. |
| 2012/0294532 A1 | 11/2012 | Morris |
| 2013/0086112 A1* | 4/2013 | Everingham et al. ......... 707/780 |
| 2013/0132190 A1* | 5/2013 | Lagle Ruiz et al. ........ 705/14.49 |
| 2013/0183952 A1* | 7/2013 | Davis et al. ................... 455/418 |
| 2013/0211700 A1* | 8/2013 | Igodt ............................. 701/117 |
| 2013/0226667 A1* | 8/2013 | Terrazas et al. .............. 705/7.34 |
| 2013/0273968 A1* | 10/2013 | Rhoads et al. ............. 455/556.1 |
| 2014/0101691 A1* | 4/2014 | Sinha et al. ..................... 725/32 |
| 2014/0149301 A1* | 5/2014 | Dickinson et al. ............ 705/319 |
| 2014/0188537 A1* | 7/2014 | Milbert et al. ............... 705/7.14 |

* cited by examiner

CROWDSOURCED SEARCH AND LOCATE PLATFORM

CROSS-REFERENCE TO RELATED APPLICATIONS

This application is a continuation of U.S. patent application Ser. No. 13/841,392, titled "CROWDSOURCED SEARCH AND LOCATE PLATFORM", filed on Mar. 15, 2013, and claims priority to U.S. provisional patent application Ser. No. 61/766,673 titled "CROWDSOURCED SEARCH AND LOCATE PLATFORM", filed on Feb. 19, 2013, and is a continuation-in-part of U.S. patent application Ser. No. 14/010,450, titled "CROWDSOURCED SEARCH AND LOCATE PLATFORM", filed on Aug. 26, 2013, which is a continuation of U.S. patent application Ser. No. 13/839,379, titled "CROWDSOURCED SEARCH AND LOCATE PLATFORM", filed on Mar. 15, 2013, which claims priority to U.S. provisional patent application Ser. No. 61/766,644, titled "CROWDSOURCED SEARCH AND LOCATE PLATFORM", filed on Feb. 19, 2013, the entire specifications of which are hereby incorporated by reference in their entirety.

BACKGROUND OF THE INVENTION

1. Field of the Invention

The present invention is in the field of image analysis, and more particularly in the field of platforms for crowdsourcing image analysis activities.

2. Discussion of the State of the Art

Image analysis has been an important field of technology at least since the period of World War 2, when extensive use of image analysis, photogrammetry, and related technologies was used in conjunction with aerial photography for intelligence and bombing damage assessment purposes (among others). However, the extent of the use of image analysis (particularly image analysis of remotely-sensed images), particularly for identifying or locating targets of interest, has always been limited by the need for highly-trained, specialized image analysts or interpreters. The need for specialized (and expensive) skills has limited the use of image analysis to a correspondingly limited range of applications (notably military, homeland defense, and law enforcement).

The market for image analysis has also historically been limited by the high cost of obtaining images to analyze. In the military arena, the benefits were sufficiently apparent that large numbers of military reconnaissance flights were made over regions of interest since World War 2. But the cost of such flights virtually totally excluded all commercial applications of image analysis. Starting in the 1970s with the Landsat satellite, this began to change as low resolution satellite images became publicly available. A series of new satellites has opened up progressively more applications as the resolution, spectral coverage, geographic coverage, and cost per image have all continuously improved; accordingly, a significant market in commercial remote sensing imagery has emerged. But even this market has been limited from achieving its full potential because of the still-present requirement for expensive, scarce image analysis talent. Some progress has been made in automated image analysis technologies, but for a vast range of current and potential applications, large scale image analysis (such as would be needed when analyzing satellite images of a large region) remains too expensive and too supply-constrained to use.

One common type of image analysis problem is the "search and locate" problem. In this problem, what is needed is to find and to precisely locate one or more targets of interest. For example, in search and rescue, it may be important to find a missing plane using satellite imagery. Another example is the finding and precise location of warships, tanks, or other military targets of interest. Less common but promising applications include such things as assessing hurricane damage by finding and locating damaged buildings and infrastructure, finding and locating potentially important archeological sites (for instance, by identifying possible ruins in deserts), and assessing the scope of a refugee problem by for example counting tents in an area of interest.

Recently, the notion of "crowdsourcing" (using very large numbers of people, each doing a small part of a large task, to accomplish large of complex tasks quickly at extremely low cost) has emerged, and a number of crowdsourcing platforms have been implemented. Some of these address topics of broad general interest (for example, Wikipedia™), and some are more specialized (for example, GalaxyZoo, where users are shown images of objects from the Hubble Space Telescope and asked to decide if the object shown is a galaxy and, if so, what kind of galaxy it is). Most crowdsourcing platforms to date rely on volunteers to perform the work, although some (such as Amazon's Mechanical Turk) are commercial in nature and pay for crowdsourced work. There have been two general approaches to managing crowdsourced work. In the first, a large, complex or repetitive task is broken up into many subtasks, with each subtask being given to a single worker; as workers complete the subtasks, the results are rolled up and the overall task is completed at low cost. Generally, various means are used to measure the quality or value of the tasks performed by each participant, so that over time a reputation or quality score can be assigned to each participant; in some cases, work is assigned based at least in part on these reputation or quality scores. The work distribution and quality measurement approach is used, for example, by Amazon's Mechanical Turk platform. A second common approach to crowdsourcing is to use an essentially democratic process to have a crowd decide a difficult question. The process is referred to as "democratic" because each participant simply votes on what the participants believes the answer to be (this is helpful for classification problems such as that described above for GalaxyZoo).

While aspects of both of these problems are relevant to the broad search and locate application domain, neither of them is sufficient. Consider the refugee assessment problem just described. The work distribution approach can clearly be used to divide up the task for distribution to many participants (typically volunteers). Similarly, the democratic approach could be used by the platform to decide whether something is or is not a tent, based on the number of votes each classification of a specific object received. But neither of these dominant approaches is satisfactory, and the two together are not satisfactory either, for the search and locate problem. It is not enough to divide and conquer, because in searching an image for a specific object considerable ambiguity will be present, and if each image segment is only viewed by a single person, there would be a high likelihood of missed targets (and indeed of false positives). If multiple participants are shown the same image and a vote is taken to decide if a target of interest is present, the outcome is better. but even in this case there are problems. Consider again the refugee problem—if there are in fact ten tents in a given field of view (image segment), various participants might report anywhere from three to twelve tents in the segment. A simple average of these counts could be taken, but would likely be inaccurate. But the "search and locate" problem also requires that the location of each tent be identified (at least implicitly—it is not so important in this particular problem that the exact location of each tent is known, but it is important to use locations to resolve count ambiguities; in most search and locate problems, though, the location aspects is a key output).

What is needed in the art is a platform for crowdsourcing the search and locate class of problems, that accurately translates a large amount of crowdsourced inputs into an estimate of the precise locations of a number of targets of interest.

SUMMARY OF THE INVENTION

The inventor has developed a platform for crowdsourcing the analysis of images, and particularly for analysis of aerial or satellite images to geolocate one or more targets of interest.

A crowdsourced search and locate platform, comprising an application server and a client interface application. The application server: receives connections from crowdsourcing participants; navigates a first crowdsourcing participant to a specific geospatial location; sends an image corresponding to the geospatial location to the first crowdsourcing participant; receives tagging data from the first crowdsourcing participant, the tagging data corresponding to a plurality of objects and locations identified by the first crowdsourcing participant. The client interface application: displays elements enabling an administrative user to configure a crowdsourced search and locate campaign; displays other elements enabling an administrative user to configure and run a crowdrank algorithm; and upon the user's selecting a particular object type icon, displays tags of the type selected by placing visual indicators at each tagged location of objects of the selected type within the plurality of image strips.

According to another preferred embodiment of the invention, a method for conducting crowdsourced search and locate operations, the method comprising the steps of: (a) receiving connections to an application server coupled to a digital packet network from a plurality of crowdsourcing participants; (b) navigating a first crowdsourcing participant to a specific geospatial location; (c) sending an image corresponding to the geospatial location to the first crowdsourcing participant; (d) receiving tagging data from the first crowdsourcing participant, the tagging data corresponding to a plurality of objects and locations identified by the first crowdsourcing participant; (e) displays a first plurality of elements enabling an administrative user to configure a crowdsourced search and locate campaign; (f) displays a second plurality of elements enabling an administrative user to configure and run a crowdrank algorithm, wherein the crowdrank algorithm takes as input a large number of object tags created by participating users in the crowdsourced search and locate campaign and determines a most likely distribution of actual locations of objects of interest; (g) displays a plurality of image strips that were viewed by participating users in the crowdsourced search and locate campaign; and (h) upon the user's selecting a particular object type icon, displays all or a substantial portion of tags of the type selected that were generated by participating users in the crowdsourced search and locate campaign, by placing visual indicators at each tagged location of objects of the selected type within the plurality of image strips.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
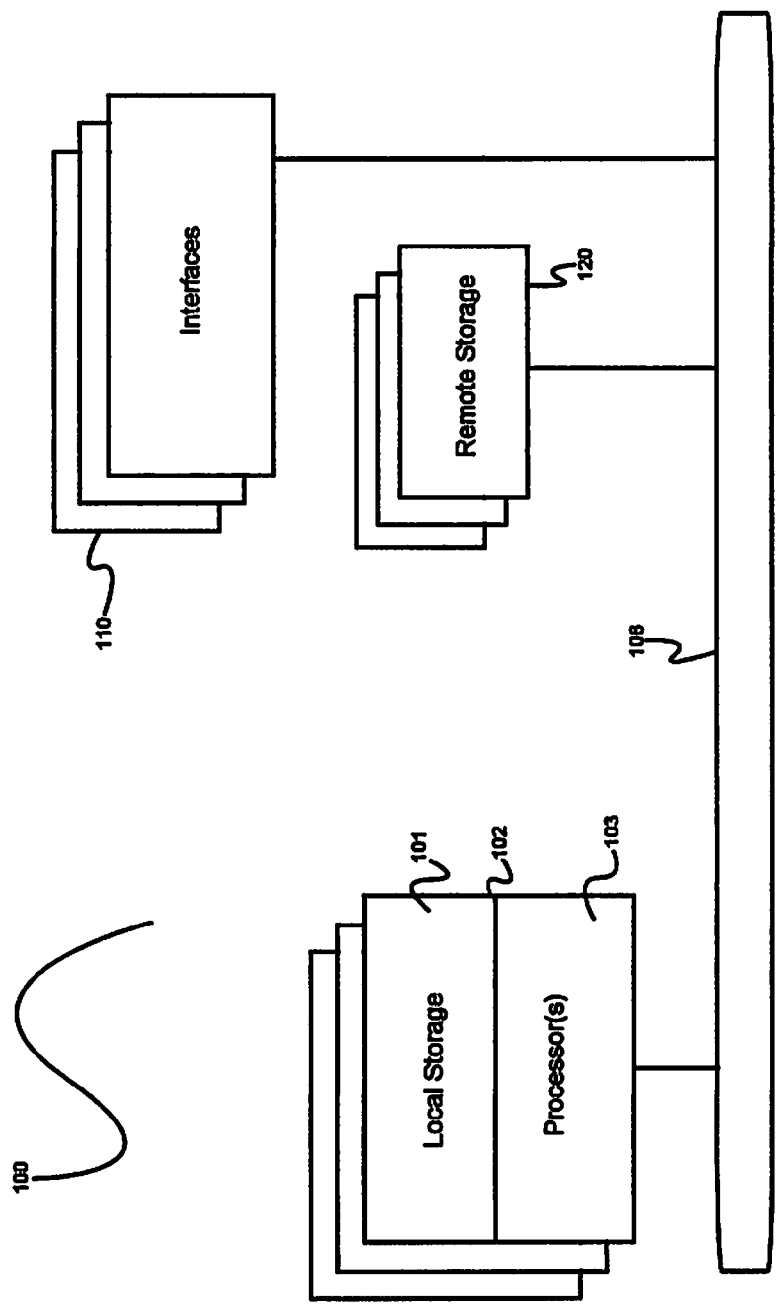
FIG. 1 is a block diagram illustrating an exemplary hardware architecture of a computing device used in various embodiments of the invention.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

DEFINITIONS

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various embodiments may preferentially employ one or another of the various data storage subsystems available in the art (or available in the future), the invention should not be construed to be so limited, as any data storage architecture may be used according to the embodiments. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

Similarly, preferred embodiments of the invention are described in terms of a web-based implementation, including components such as web servers and web application servers. However, such components are merely exemplary of a means for providing services over a large-scale public data network such as the Internet, and other implementation choices may be made without departing from the scope of the invention. For instance, while embodiments described herein deliver their services using web services accessed via one or more webs servers that in turn interact with one or more applications hosted on application servers, other approaches such as peer-to-peer networking, direct client-server integration using the Internet as a communication means between clients and servers, or use of mobile applications interacting over a mobile data network with a one or more dedicated servers are all possible within the scope of the invention. Accordingly, all references to web services, web servers, application servers, and an Internet should be taken as exemplary rather than limiting, as the inventive concept is not tied to these particular implementation choices.

As used herein, "crowdsourced" refers to the use of large numbers of participants, each working independently of the others over the Internet, to accomplish a complex or large (or both) task provided by a requesting entity. Generally, the task is divided into many subtasks, each of which can be completed satisfactorily by a human without reference to any other information beyond what is provided with the subtask. These subtasks are distributed by a "crowdsourcing platform" to many different participants, some of whom receive more or less subtask volume based on quality, cost, willingness, or other parameters. In some cases, participants "pull" subtasks from an inventory of pending subtasks. Some subtasks may be submitted to more than one participant, while others may be provided only to one participant. As each participant completes the subtasks assigned (or pulled), the resulting work is aggregated by the platform and a completed set of results for the overall task is provided to the original requesting entity.

As used herein, "crowdsourcing campaign" refers to a specific instance of a crowdsourcing application used to solve a specific problem. For instance, a crowdsourced image analysis platform of the invention facilitates image analysis by many users; a crowdsourcing campaign organizes such activities (and such users) for a specific image analysis problem. For example, a crowdsourcing campaign might be set up and operated whose goal is to find a downed airplane. Generally the crowdsourcing platform will be configured generally for a plurality of campaigns, but a specific campaign will have its own configuration; in the example given, the campaign's configuration would include the expected region of interest and imagery associated with it, particular details about how to distribute image analysis tasks in the campaign, what criteria will be used to identify to a requesting entity when a target of interest is identified and what confidence level exists for the identification, and so forth.

As used herein, "search and locate" refers to a general class of problems wherein a set of images is searched for particular classes of targets (such as buildings, tanks, railroad terminals, downed airplanes, etc.). It is common that the set of images may be searched to find more than one class of targets (for example, to find all targets of military interest), although single target class searches may also be performed ("find all cars"). Moreover, in some cases it may be known or presumed) in advance that only a single target of interest exists (a lost climbing party, or a downed airplane), while in most cases the number of targets present in a given image set is unknown. The second part of the search and locate problem is to precisely locate any resulting targets of interest (where is the down plane or lost party of climbers?).

As used herein, "image analysis" refers to the analysis of images obtained from one or more image sensors; generally, a single analysis task focuses on a set of images of a single region of interest on the earth. Satellite and aerial imagery are common examples of imagery that are subjected to large scale image analysis. However, the invention described herein is not limited to common remote sensing image analysis problems associated with satellite and aerial imagery. For example, analysis of large image sets from traffic cameras may be performed using techniques described herein.

As used herein, a "requesting entity" is a person or organization that requests a specific set of crowdsourced image analysis campaigns to be carried out via a crowdsourcing platform. That is, a crowdsourcing platform may be operated by a single organization specialized in hosting such a platform, and be made available to a wide range of requesting entities (i.e., third parties) who may sign up for, manage, and pay the platform operator to execute various crowdsourcing campaigns. For example, a government agency seeking to augment a search and rescue operation may be a requesting entity, setting up an image analysis campaign on a crowdsourcing platform.

As used herein, a "participating user" is a person, or a group of persons, that participates in a crowdsourcing campaign as a provider of service. Crowdsourcing relies on distributing tasks to a crowd; that crowd is comprised of participating users.

As used herein, "tags" are data points created by a participating user's "tagging" a specific point as corresponding to a specific target type. For instance, a participating user may place his cursor over a location on an image that was presented to him, and select "tank" in order to generate a tag that states that a tank is present in that image at that location.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire, PCI, parallel, radio frequency (RF), Bluetooth, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java compiler and may be executed using a Java virtual machine or equivalent, or files containing higher level code that may be executed by the computer using an interpreter (for example, scripts written in Python, Perl, Ruby, Groovy, or any other scripting language).

Figure 2:
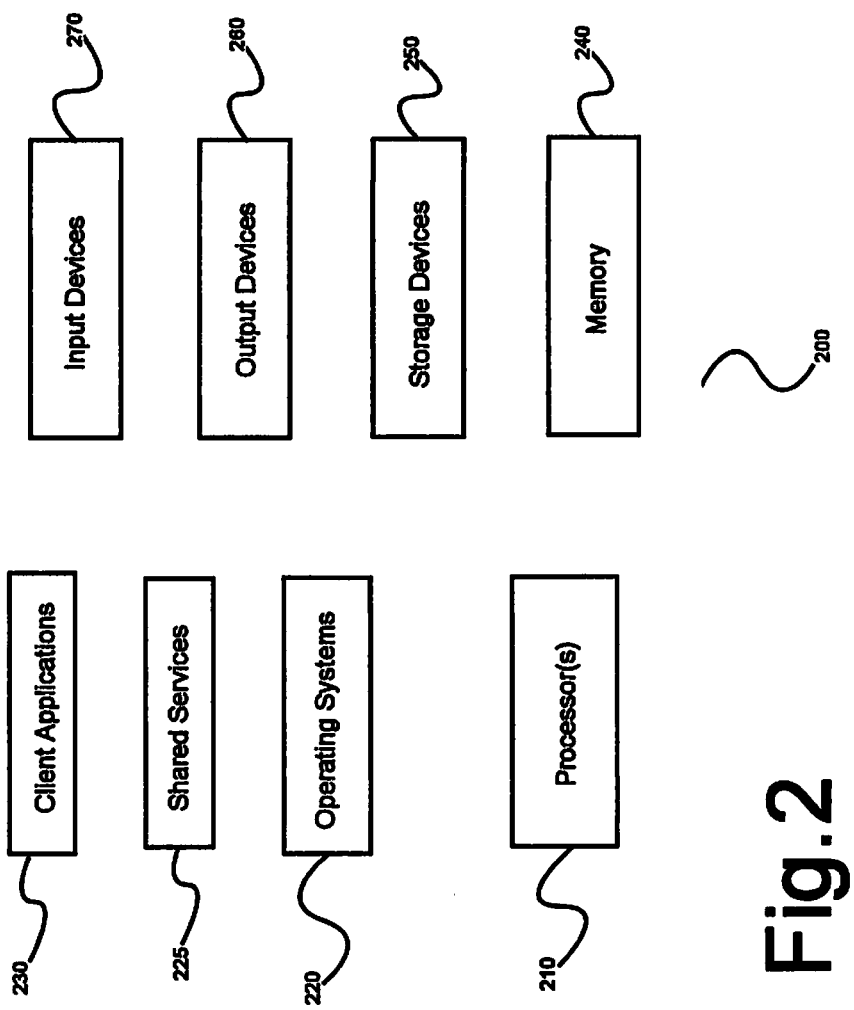
FIG. 2 is a block diagram illustrating an exemplary logical architecture for a client device, according to various embodiments of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows operating system, Apple's Mac OS/X or iOS operating systems, some variety of the Linux operating system, Google's Android operating system, or the like. In many cases, one or more shared services 225 may be operable in system 200, and may be useful for providing common services to client applications 230. Services 225 may for example be Windows services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
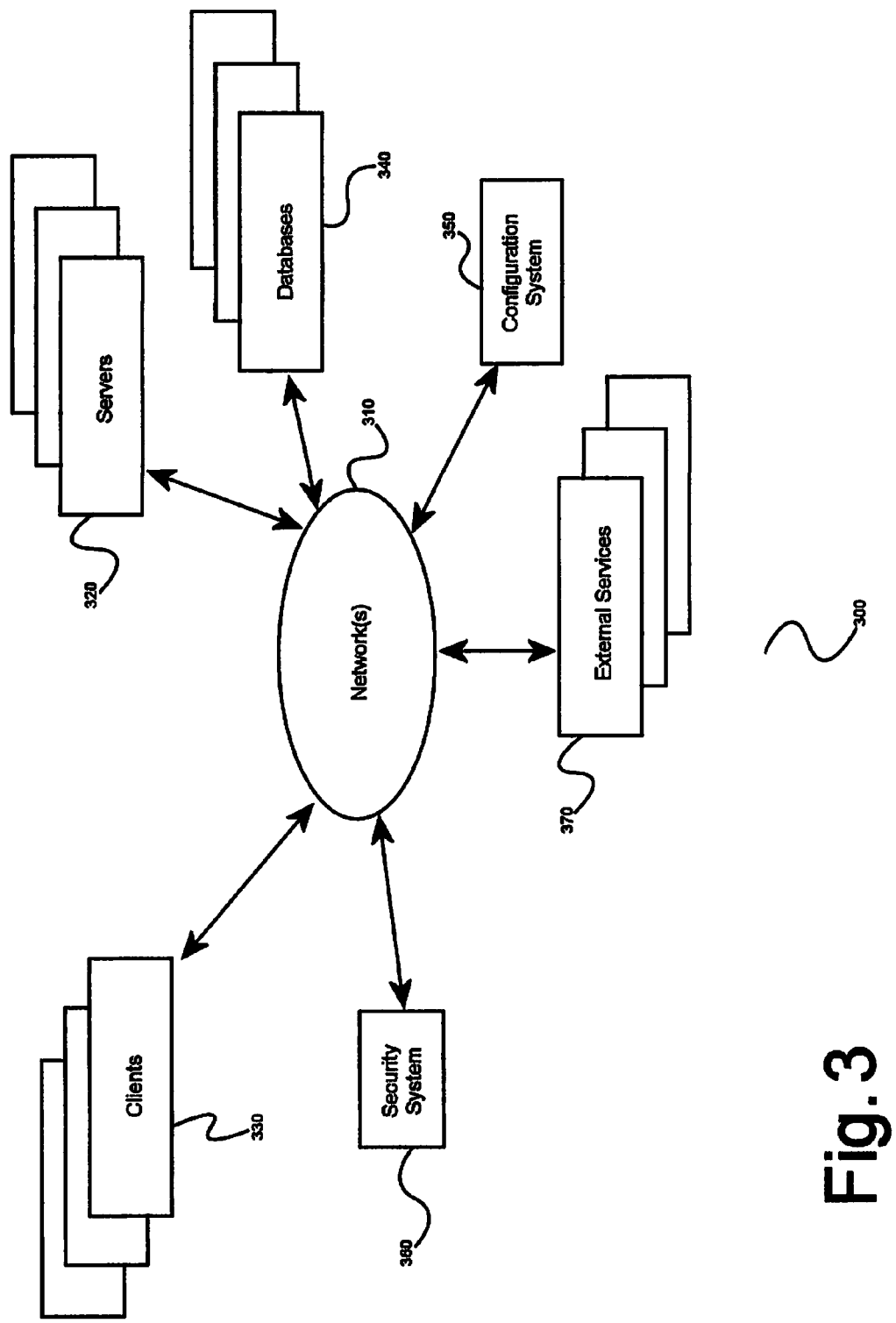
FIG. 3 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop, MapReduce, BigTable, and so forth). In some embodiments variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration 350 system or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules can be variously implemented to run on server and/or client components.

Description of System Architecture

Figure 4:
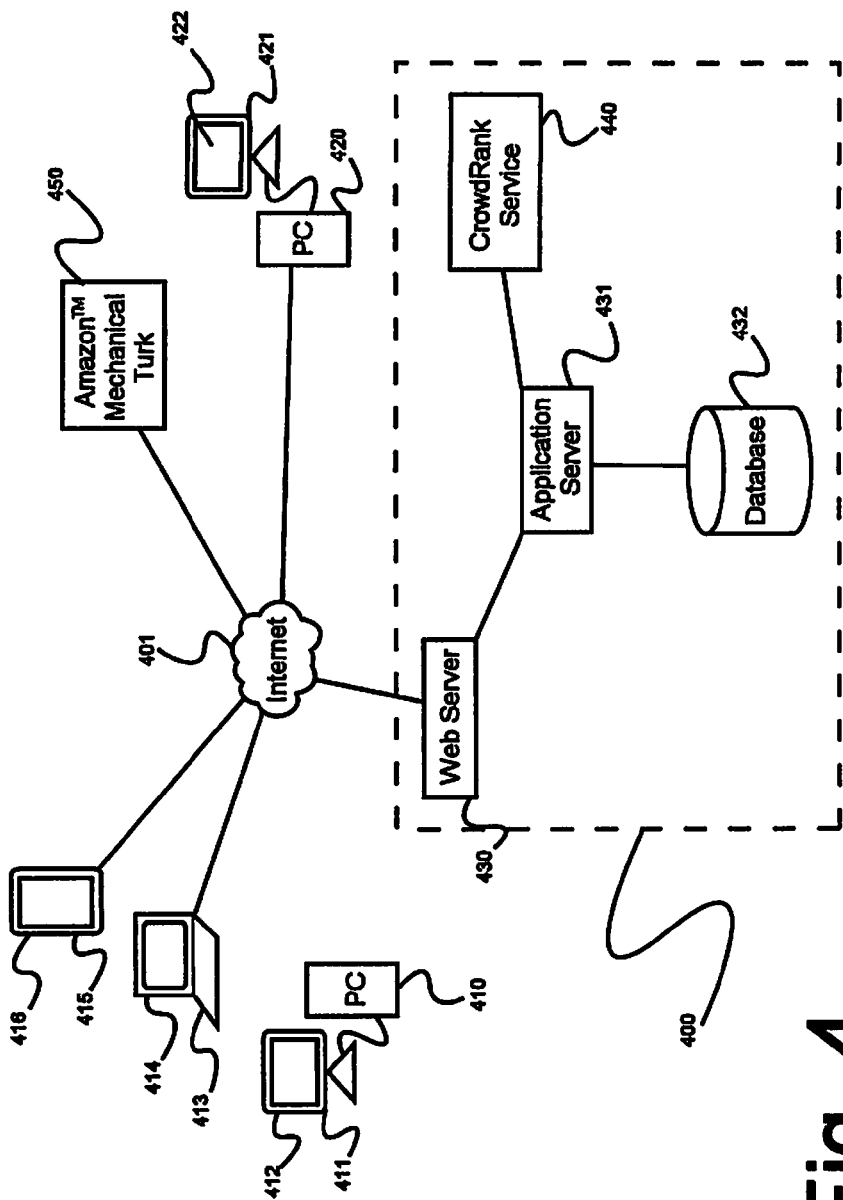
FIG. 4 is a diagram of an exemplary architecture for a platform for crowdsourced image analysis, according to a preferred embodiment of the invention.

FIG. 4 is a diagram of an exemplary architecture for a platform 400 for crowdsourced image analysis, according to a preferred embodiment of the invention. According to the embodiment, crowdsourcing is accomplished by distributing image analysis tasks to various participant users, who typically access platform 400 via Internet 401 from tablet devices 415, laptops 413, personal computers 410 with monitors 411, or other Internet-accessible computing devices. Access to platform 400 is typically, although not necessarily, made using a browser 412, 414, 416 (or a similar Internet-connected software application). As is typical of Web applications, platform 400 may be accessed by participating users via web server 430, which may comprise web server software such as Microsoft Internet Information Server, Apache Web Server, IBM Websphere Web Server, or any other web server known in the art, stored and operating on a single network-attached server computer or a cluster of server computers, or it may comprise such software operating on a plurality of such machines, and may be placed behind a load balancer (not shown) that distributes requests among the various instances of web server 430. As is typical of Web applications, participant user requests pass from browsers 412, 414, 416 via Internet 401 to web server 430, which stores and returns static web page elements locally, and passes application-specific requests to application server 431. Application server 431 may be any particular form of application server known in the art, such as Apache Tomcat or Geronimo, Java Platform Enterprise Edition, RedHat JBoss AS, Windows Server, or IBM WebSphere Application Server; further, it will be understood by one having ordinary skill in the art that this list is merely exemplary and is in no way limiting. Application server 431 may comprise application server software stored and operating on a single network-attached server computer, or it may comprise such software operating on a plurality of such machines, and may be placed behind a load balancer (not shown) that distributes requests among the various instances of application server 431. As is common in the art, application server 431 uses a database 432 to store application-specific data. Typically (although not necessarily), application server 431 will offer a stateless representation state transfer (REST) application programming interface (API) to users via web server 430, and accordingly all application state data is maintained in database 432, which facilitates scalable operations (since each application server 431 instance is not required to maintain state information separately, and since the need for complex state propagation between application servers is thereby eliminated. Of course, it will be appreciated by one having ordinary skill in the art that the general architecture of a web server 430 coupled to an application server 431 via a REST API, with database 432 storage of application data, is typical of scalable web applications but is also merely exemplary. It may be desirable in some cases for a client-server connection between dedicated applications 412, 414, 416 and a dedicated server software 431 that uses a proprietary interface and could even be a stateful server application.

With this basic architecture in mind regarding the connections between participating users and application server 432, specific aspects of the invention will now be described. Before participating users can participate in a crowdsourcing campaign, a requesting entity must set up the campaign. Requesting entity (and administrative) users interact with application server 431 via the Internet 401 and web server 430 just as participating users do; a single PC 420 with monitor 421 and browser 422 is shown in FIG. 4 to represent administrative and requesting entity users (it should be noted of course that only PC 420 is shown for brevity; as with participating users, administrative/requesting entity users may use any suitable Internet-capable computing device according to the invention). Requesting entity users will generally create and manage crowdsourced image analysis campaigns, and will view results of such campaigns (possibly adjusting the settings of such campaigns as a result of such reviews, to improve the performance of such campaigns). Once a campaign is set up, it may be activated by the requesting entity, at which point participating users may "join" the campaign and thereupon start receiving image analysis tasks associated with the campaign to perform. In a preferred embodiment, images are delivered form database 432 to participating users by application server 431 via web server 430, and participating users interact with such images in web browsers 412, 414, 416 using tools provided by application server 432. In some embodiments, however, third party crowdsourcing platforms such as Amazon's Mechanical Turk 450 may be used to manage a crowdsourced image analysis campaign using images and requirements provided by application server 431 or directly from database 432.

As noted above in the background section, one common challenge in search and locate problems, which is not addressed by current crowdsourcing techniques (which, as noted, use either or both of the work distribution with quality measurement and the democratic/voting techniques), is the problem of accurately finding and locating targets of interest using crowdsourcing. The shortcomings of the two main crowdsourcing approaches (work distribution and voting) are different for each approach. The work distribution approach is still useful in search and locate problems, but it is not adequate by itself, as it does not provide a means for locating targets of interest, particularly when many participating users "tag" the same target of interest, often with varying locations (generally nearby, but in some cases even quite distant from each other). The voting approach, while excellent for ranking reputations (is this a good song or not?) or for classification problems (is this a tank or not?), does not handle continuous variations of input data well. That is, voting is good when there is a small set of possible options (which is this: a dog, a cat, or a skunk?); the resulting tallies for each discrete element of the set can be compared and a "winner" selected (it's a cat). But when the input provided by participating users is not only the presence of an object but also its two-dimensional location (or even three-dimensional location), the simple voting approach does not help to answer the question, "where is it, really?"

Accordingly, in a preferred embodiment platform 400 further comprises a CrowdRank service 440, which may be stored and operating on a single network-attached server coupled to application server 431. In some embodiments, CrowdRank service 440 operates on a large number of independent machines whose activities may be coordinated using an approach such as the well-known map/reduce technique. CrowdRank service 440 takes as inputs a (typically large) set of tags from many participating users. Fundamentally, CrowdRank service 440 implements a CrowdRank algorithm (described in detail below) that attempts to determine a "most likely" set of targets that are present in an image, using a large amount of tagging data obtained from participating users viewing the same or related images. Because location tagging is an inherently noisy process (people vary widely, at a minimum; in addition, some viewers may view an image at higher resolution than others, while some may tag an extensive object at its centroid while others tag it at various points on its edges, and so forth). Therefore, it will usually be the case that tag data input to the CrowdRank service 440 is very noisy; for example, if there are several targets of interest close to each other "in the real world" (i.e., in the place from which the image was taken, at the time the image was taken), the inevitable inaccuracies in users' tagging may result in (for example) a single cloud of nearby tags that might be interpreted as belonging to a single target of large extent but actually belongs to two or more "real" targets. The CrowdRank algorithm may optionally take as input one or more sets of prior data, for instance regarding the quality of a specific set of participating users' previous tagging work; such prior data will (as described below) be used to improve the time to convergence of the algorithm. Given these inputs, the CrowdRank algorithm uses an iterative expectation-minimization process to generate, as outputs, three sets of data. The first is an array of quality scores for the taggers (the participating users who created tags as part of the crowdsourcing campaign whose data is being analyzed by the CrowdRank algorithm). The second is an array of difficulty scores for each tagged target. The third is an array of estimated locations of actual targets, comprising for each target data such as the latitude and longitude of the target, the type of the target (tank, railroad car, damaged building, debris field, etc.), and a confidence level in the identification.

Fundamentally, the CrowdRank algorithm is focused on identifying an underlying hidden variable (the real targets that existed at a time of interest) using incomplete data (the tagging data, which won't necessarily have tags for all of the real targets, and which may have many tags for each real target). In order to move from the inputs (principally tag data, each tag comprising a tag identifier, a tagger identifier, a location (latitude and longitude, or a UTM grid point and easting and northing values for the offset from that UTM grid point), the CrowdRank algorithm carries out a key data transformation, the uses a modified iterative expectation-minimization (EM) algorithm to generate a set of intermediate outputs, then performs a clustering on the interim outputs to arrive at the final CrowdRank output. The details will be described below, but at a high level the initial data transformation involves converting straightforward geolocation information (a series of tags generated by participating users) into a set of agreement/ disagreement data (meaning agreement or disagreement among the participating users of the input set). Also, since EM algorithms known in the art take an input vector and a parameter vector and attempt to identify a vector corresponding to a hidden variable of which the input vector represents a (possibly noisy) subset, in the CrowdRank algorithm the vector of quality scores and the vector of difficulty scores are mathematically combined and treated as the parameter vector for EM algorithm purposes.

From a use case perspective, what is accomplished using platform 400 includes: setting up (by requesting entities) image analysis campaigns; running the campaigns to generate tag sets from participating users; displaying the results to one or more requesting entity users; and using the CrowdRank algorithm with the results as input to generate an estimate of ground truth (that is, an estimate of the actual targets of interest and their locations) and displaying the same to the requesting entity users.

Description of Method Embodiments

Figure 5:
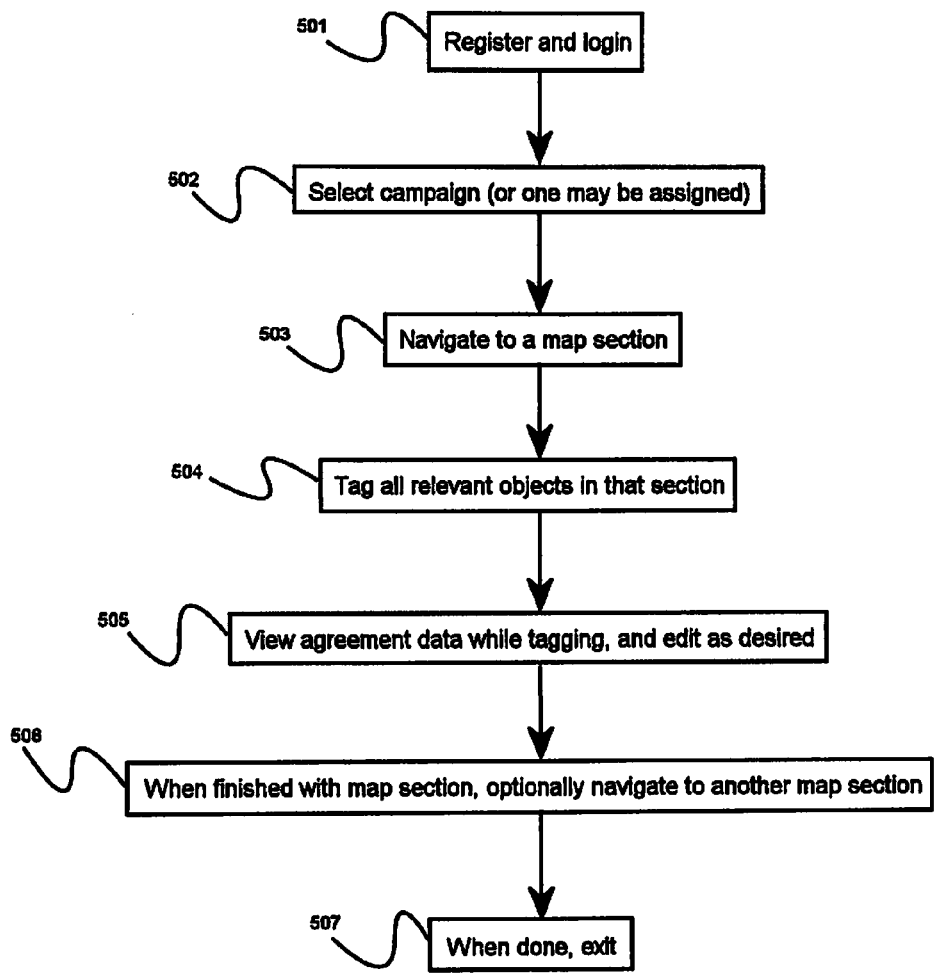
FIG. 5 is a process flow diagram of a method to allow a plurality of users to participate in crowdsourced image analysis, according to a preferred embodiment of the invention.

FIG. 5 is a process flow diagram of a method 500 to allow a plurality of users to participate in crowdsourced image analysis, according to a preferred embodiment of the invention. According to the embodiment, in step 501 a participating user may register with platform 400 (thereby obtaining a user identifier), and once registered, may log in to platform 400 in order to participate in one or more crowdsourced image analysis campaigns. It will be appreciated by one having ordinary skill in the art that there is a variety of information that may be obtained by platform 400 during user registration, such as user name, user background, type of user (volunteer, paid, etc.), organizational membership, tagger group memberships, and the like. For example, a new user may register as a member of an organization that is focused on a particular campaign, set of campaigns, or type of campaigns (for example, a "league of armchair military analysts", whose members focus only on military analysis, such as tracking developments in combat areas such as Syria or Mali); alternatively or also, a user may register as a member of one or more existing "tagger groups" (such as search and rescue, climate change damage assessment, and so forth). In some embodiments, "passive login", such as logging in using Facebook™ or Mechanical Turk™ credentials, may be provided; for example, a user may be logged in automatically with an identifier corresponding to his Mechanical Turk™ or Facebook™ identifier, and the user would therefore not see a login process occurring. Once a participating user has logged in, he may be presented with a list of active campaigns for which he is eligible (campaigns may be unrestricted, meaning every registered user is eligible to participate, or they may be limited to participating users from specific organizations or tagger groups, or to participating users who satisfy some criterion such as experience level, average quality rating, Mechanical Turk™ qualification, etc.). Upon viewing such a list of available campaigns, in step 502 the user may select a campaign in which he wishes to participate; alternatively, in step 502 platform 400 may automatically assign the user to a specific campaign upon login. In support of the selection process of step 502 (when performed manually by a participating user), the user may be shown a list (using any of the many well-established user interface conventions for displaying lists from which selections are to be made) of available campaigns that the specific user may participate in. In some embodiments, some campaigns may be limited to certain classes or groups of participating users; for example, a sensitive law enforcement campaign may only be made available/visible to qualified law enforcement personnel (this may actually occur, for example, when a high-profile search for a target is needed, and law enforcement personnel from a wide variety of agencies may desire to assist informally, without sensitive information being divulged to the public at large). In some embodiments, campaigns may be assigned automatically by platform 400 in step 502, for instance where new participating users are assigned to a specific training campaign until they complete the required training or otherwise demonstrate proficiency.

Once a campaign has been selected by or for a participating user, in step 503 the user may navigate to a specific map section to carry out tagging operations (that is, to attempt to identify and locate targets of interest in the map section to which the user has navigated). Again, as in campaign selection, in some embodiments automated action may be taken in step 503, rather than allowing a user to manually select a map section for viewing. For example, it may be important that users are not provided information about the actual map location (that is, grid coordinates or latitude and longitude) of map sections as they view them and carry out tagging operations. In some cases, it may be important that users are unable to identify the actual, physical location of a target of interest on the earth's surface (for instance, to prevent looting of valuable archaeological sites). Accordingly, users may be "navigated" automatically in step 503, by being shown successive map sections without their spatial locations or relationships being known. In some embodiments, platform 400 may enforce a sampling regimen wherein various map segments are assigned probability levels (of having targets of interest in them) or interest levels, and the number of participating users who are encouraged or made to view specific map sections may vary accordingly (more users might be assigned to more interesting, promising, or difficult map sections). Similarly, in some embodiments users may be provided an option to manually navigate or to have the system navigate for them (for instance, they could be provided a "next" button, or a "surprise me" button, as well as a small map of an entire interesting region via which they can manually navigate by selecting a map segment using for example a computer mouse or a touchpad). Once a participating user is "in" (i.e., viewing) a particular map segment, the user tags all relevant objects (targets of interest) in that section in step 504 (of course, it should be apparent that not all users will find all actual targets in any given map segment; skill, persistence, and interest level—among other variables—may cause some to tag only a subset, and others to tag false targets of interest, and so forth). In some embodiments, in step 505 a participating user may view agreement data while tagging objects. For example, when a user moves a graphical cursor to a specific map location and selects an action (e.g., "tag as tank"), a graphical indicia may be displayed advising the user how many other users placed a similar tag there (or within a reasonable—and configurable—distance from the user's cursor location); in some embodiments, a second graphical indicia such, as a colored cursor, may be provided to indicate a position of the centroid of a set of other users' tags, effectively indicating to the participating user information such as, "ten other people tagged a tank, but the group locates the tank at this slightly different location". Accordingly, users may be provided a means to edit their tags (for example, by clicking and dragging their tag onto the marked centroid position, or to adjust its position relative to an underlying image feature, as desired). When editing is completed in step 505, a user may simply move on to make another tag, or may be provided with a positive confirmation means, such as a clickable "Tag" button, to indicate that a particular tag will no longer be edited, but a new tag may be placed in the current map segment. In some embodiments, some or all users may not be shown agreement data, for example to encourage "open minded" tagging by suppressing feedback from other users' activities.

In step 508, once a participating user is finished tagging objects in a specific map section (typically, because either the user is bored with a particular map section, or the user believes she has tagged all targets of interest), the user may navigate to another map section (again, manually or automatically), and resume carrying out method 500 in step 504. In step 507, when a user is finished, either because the user decides to complete their tagging session, or because a campaign setting is reached (for instance, a campaign might specify that no user should do more than ten map sections at a time), then in step 509 the user exits method 500 (typically by navigating away from the web page provided by platform 400 for participating users).

Figure 6:
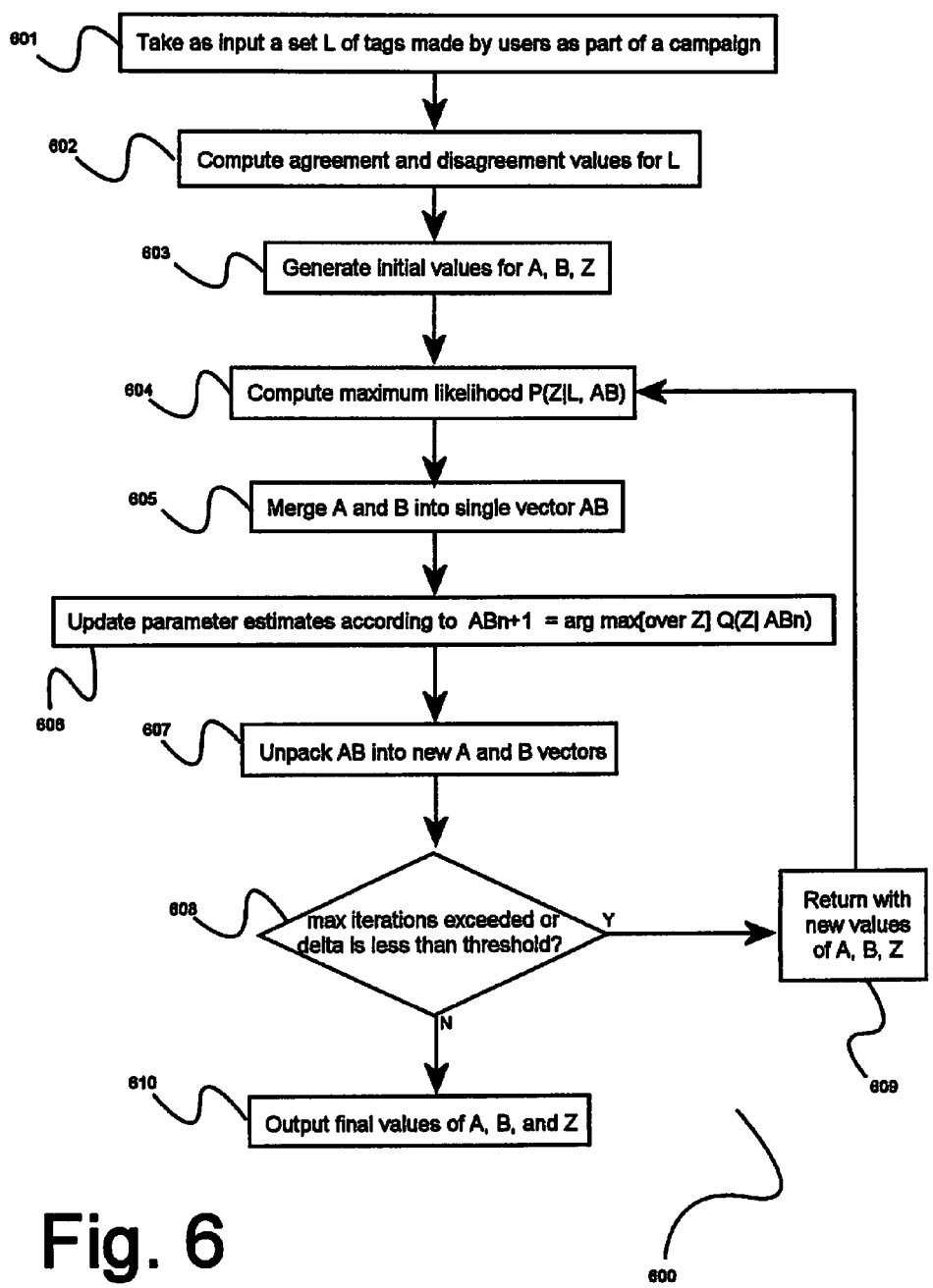
FIG. 6 is a process flow diagram of a method for estimating location and quality of a set of geolocation data based on tag data provided by a plurality of users of a crowdsourced image analysis platform of the invention.

FIG. 6 is a process flow diagram of a method 600 for estimating location and quality of a set of geolocation data based on tag data provided by a plurality of users of a crowd-sourced image analysis platform of the invention. In a first step 601, a set L of tags made by participating users (using method 500) for a particular campaign is loaded as input to method 600. Typically, each tag will comprise a tag identifier, a tagger identifier (each participating user is given a unique identifier, and all tags made by a specific participating user will have the same tagger identifier), a location (either latitude and longitude, or UTM grid plus easting and northing values, or another geospatial reference location), and a type of tag (for example, "tank", "debris field", "building", and the like). Of course, other data elements may be provided as well, such as overlay identifiers (when multi-layer maps and tagging are used), but the core elements of tag identifier, tagger identifier, tag type, and tag location will generally always be present. In step 602, each tag in L in turn has agreement and disagreement values computed. This is done by taking a specific tag and then looping over all other tags in L. The specific tag may be given an agreement value of 1 (because it by definition agrees with itself; of course, values other than 1 may be used for agreement, according to the invention). For each other tag that is considered with respect to the specific tag, a distance computation is made from the specific tag to the other tag. In a preferred embodiment, if the computed distance is less than a first specified (configurable) value (i.e., the other tag is "close" to the specific tag), then a new entry is added to L for the other tag, and an agreement value of 1 is assigned; if the distance is more than the first specified value but less than a second specified (also configurable) value (the second specific value always being greater than the first specific value), then the other tag is "sort of close" to the specific tag, and a new entry is added to L for the other tag, with an agreement value of 0 (disagreement; as in the case of agreement, a value other than 0 can be used in some embodiments); finally, if the computed distance is greater than the second specific value, then the other tag is considered unrelated to the specific tag, and no new element is added to L. It should be clear that, upon completion of step 602, a vector of tags L that initially had length Len(L) will now be much larger, having a length given by X*Len(L), where X is the average number of new entries added per tag (that is, the average number of tags that are either close or sort of close to a given tag); furthermore, each element in L will, after step 602, have an agreement/disagreement value.

It should be noted that the method just described is one way of assigning "agreement" and "disagreement" values; others are possible according to the invention as well. For example, consider that the radius may represent a circular "kernel" with the tag of interest at its center. If another tag were inside the kernel, it could be considered to agree with the tag of interest. One can then extend the idea of a kernel to include any arbitrary shapes (and one can assign agreement values that are between zero and one, for example depending on distance from the center). As an example of such an approach, when detecting roads or other straight-line type of features, the kernel could be a long skinny ellipse. The ellipse could be rotated through all possible angles; the angle for which the highest number of other nearby tags "agree" would be the one that is chosen and then used to establish agreement and disagreement values (which again may be binary or continuously-valued). Of course, other shapes could also be rotated; for example, an "X" shape could be used to detect road intersections. Similarly, disagreement also can be assigned in many possible ways. The way described above corresponds to a disagreeing tag's falling inside of one kernel while falling outside of another. Or, a tagger who views an area of another user's tag but does not "agree" automatically disagrees. In this case, it is not a tag "disagreeing" with another tag, but rather it is another user disagreeing with a tag of interest. In some embodiments, it is desirable to send users to a specific, discrete set of locations, in order that it may be definitely established that two or more users saw exactly the same thing, in which case disagreement can be more readily ascertained (and with a higher degree of confidence).

Once L has been expanded as described in step 602, in step 603 initial values are assigned for arrays A, B, and Z. A is an array comprising one element for each unique tagger (participating user) who has provided at least one tag to L. Each element of A may comprise a tagger identifier (the unique identifier for a specific participating user), a mean quality of tags made by the specific tagger, and a standard deviation of the quality of tags made by the specific tagger. "Quality" means, in a preferred embodiment, a value from −1 to 1, where −1 means the specific tag by a specific tagger is completely malicious (known to be false), 1 means the specific tag by the specific tagger is completely trustworthy (known to be true), a value less than 0 but not equal to −1 means the tag is more likely than not to be malicious, and a value greater than 0 but less than 1 means the tag is more likely than not to be reasonable (i.e., not malicious). A value of 0 indicates that a tag is inaccurate but not malicious. Initial values of the elements in A may be either loaded from database 432 as priors, or may be instantiated (for each tagger identifier) with default values (such as 0 mean, 0 standard deviation). Similarly, quality values may be assigned based on disagreement; for instance, a user may see a really obvious object to tag and not tag it, either because he is inept or malicious. Each element of B may comprise a tag identifier (the unique identifier for a specific tag), a mean difficulty of the tag as made by various taggers (that is, if many taggers identified a "tank" at a location, the difficulty scores for each such tag are averaged), and a standard deviation of the difficulty of the tag as made by various taggers. "Difficulty" means, in a preferred embodiment, a value from 0 to 1, where 0 means the specific tag is "very easy" (very likely to be correctly tagged by a random tagger), and 1 means the specific tag is "very hard" (very unlikely to be correctly tagged by a random tagger). Initial values of the elements in B may be either loaded from database 432 as priors, or may be instantiated (for each tag identifier) with default values (such as 0.5 mean, 0 standard deviation). Each element of Z may comprise a tag identifier (the unique identifier for a specific tag), and a probability value, which represents the probability that the specific tag is correct (meaning it correctly tags a real object). Initial values of the elements in Z may be either loaded from database 432 as priors, or may be instantiated (for each tag identifier) with default values for the probabilities for each tag (such as 0.5). Recall that L is a set of input obtained from users attempting to tag objects in images; it is assumed that there is a hidden variable representing the set of all actual targets of interest in the region covered by the images, so the probabilities in Z represent the likelihood that a given tag represents an actual object in the specific geospatial location associated with the tag in question. The goal of method 600 is to obtain maximized (at least locally) values of Z, given parameter sets A and B. Accordingly, in step 604 (the expectation step), an expectation of the maximum likelihood P that Z reflects the underlying hidden variable (the actual targets of interest in the image field), given the parameter vectors A and B, is computed in the normal way using the current values of A and B. Then, in step 605, vectors A and B are merged into a single vector AB (note that each element of A and of B has form {ID, Mean, StdDev}, so merging the two vectors—by concatenation—creates a single vector comprising elements of the same form), in preparation for carrying out the maximization step. Then, in step 606, the maximization step is carried out by estimating a new value $AB_{n+1}$ based on $AB_n$ by iteratively computing the argument of the maximum of $Q(Z|AB_n)$ over all Z, where Q is computed in the normal way. Once this is done, the vector AB is unpacked into its components A and B in step 607, and in step 608 a test is made to determine whether either a configured maximum number of EM iterations has occurred (requiring termination to avoid possible endless loops and to limit the time of operation of the CrowdRank algorithm) or whether the change in AB is less than a configured minimum (meaning convergence has occurred); if either of these conditions is met, then method 600 moves to step 610 and the final values of A, B, and Z are output by CrowdRank service 440 to the user or application that originally requested the CrowdRank algorithm to be executed. If neither of the conditions of step 608 is met, then in step 609 the new values of A and B (taken from the unpacked $AB_{n+1}$) and Z (determined as part of the maximization step) are returned and execution resumes again at step 604, for another iteration of the EM algorithm.

Figure 7:
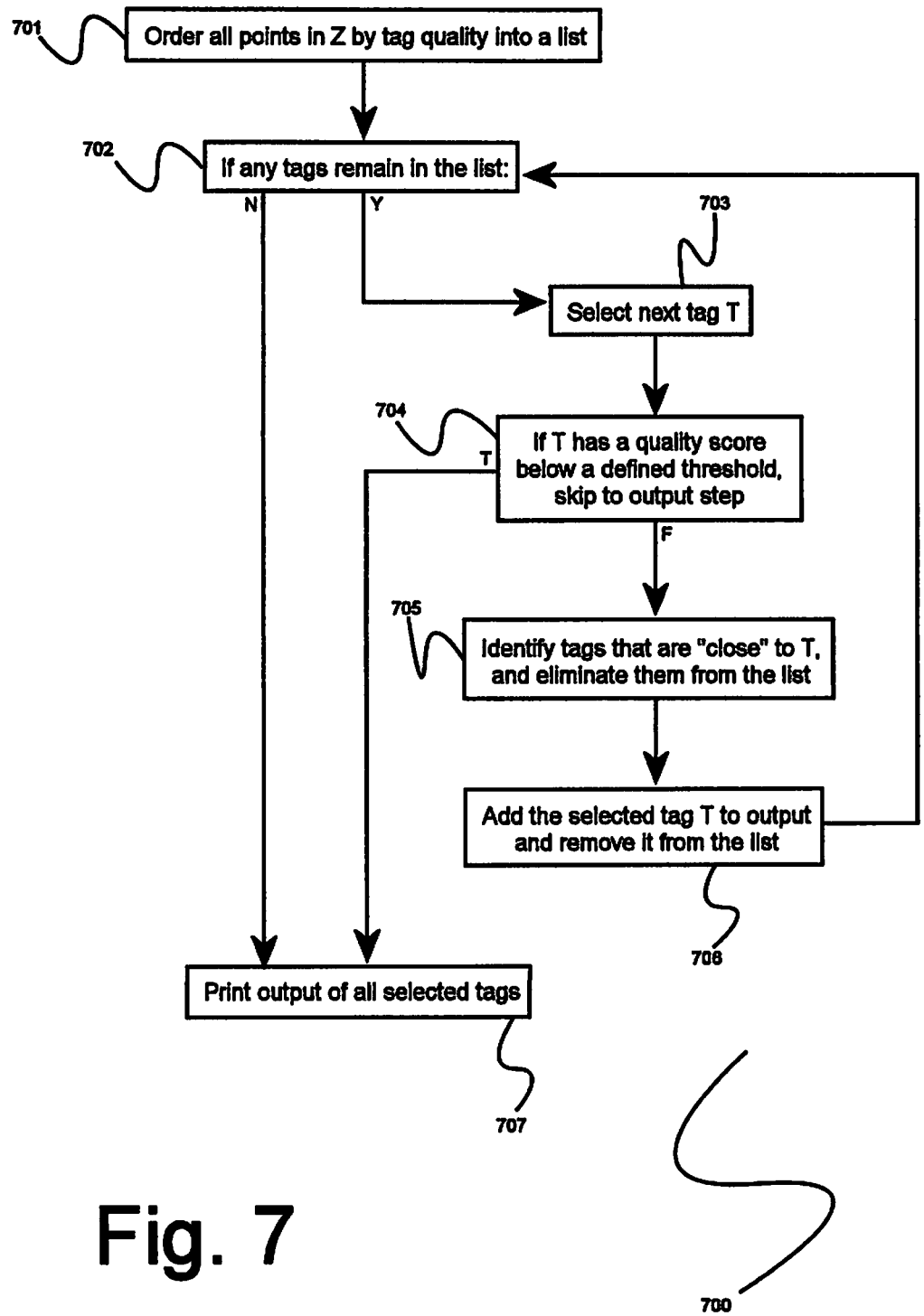
FIG. 7 is a process flow diagram of a method to accurately geolocate a plurality of targets using a crowdsourced image analysis platform of the invention.

FIG. 7 is a process flow diagram of a method 700 to accurately geolocate a plurality of targets using a crowdsourced image analysis platform of the invention. Once the method 600 has been carried out, an array of tags and their probabilities (that is, Z) is available, but it is still unclear what a set of real or actual targets of interest in the region covered by the images from which the tags were made is. For example, many of the tags in Z may be duplicates of other tags (for instance, if several different taggers tag the same object), and the precise location of each real object is yet to be determined. It should be evident that such locations are likely to be closest to the corresponding tag that has the highest probability value (recall that Z comprises tuples of {tag ID, probability}). Accordingly, a clustering method 700 is provided in various embodiments of the invention. Upon commencing method 700, in step 701 all of the points in Z are ordered (sorted) by tag quality (that is, by the probability of each tag's being correct). Then, in step 702 a check is made to see if any tags remain in the list; if none do, execution passes to step 707 and the output of all selected tags is printed or returned to a requesting entity. Otherwise, in step 703 the next tag T (by definition, the highest remaining tag in order of probability/quality) is selected. In step 704, the quality score or probability of tag T is checked to see if it is below a defined (configurable) threshold. If it is below the threshold, then execution jumps to step 707 and the output of all selected tags is printed or returned to a requesting entity. If the quality score of tag T in step 704 is above the threshold, then execution continues to step 705. In effect, step 704 and the threshold it uses together mean that all tags whose quality is below the configured threshold are discarded and never placed into the output buffer that is passed to step 707. In step 705, all tags (necessarily below T in the list Z) that are close to T (that is, whose geospatial distance from T is less than a configured distance, which may or may not be the same as the first specific distance used in method 600; or all tags that are inside a specific agreement kernel) are discarded from the list, and in step 706 tag T is added to an output buffer (which starts as an empty buffer before step 701), and tag T is removed from list Z (note that in most embodiments a "working copy" of Z would be used in method 700, so the full original Z is maintained for use elsewhere). Once T has been added to the output buffer and removed from Z (or "the working copy of Z"), execution returns to step 702. Thus it will be apparent to one having ordinary skill in the art that the clustering approach of method 700 starts with Z (and gets location data from L using the tag identifier in each element of Z), and works down the list in order of probability (quality), taking each tag T, removing its nearby neighbors from the list, adding T to the output, and removing T from the list until either the list is emptied or the next tag T has a quality that falls below a defined threshold. Thus for each tag T' in the output when execution passes to step 707, there is a strong likelihood that the object specified by tag T' actually exists, and that the output contains no duplicates. It will be apparent that the setting of the "closeness parameter" used in step 705 is an important parameter, since in general if two real objects exist in the region covered by the image set used, and their real distance is less than the "closeness parameter", method 700 will likely report only one target in step 707. This would argue for a low value of the closeness parameter; however, a very low value of the closeness parameter would result in many duplicate objects in the output of step 707 if it is set to a value lower than or close to the average error in tag location made by users. Fortunately, since the computational cost of methods 600 and 700 is quite low for reasonably sized datasets, it is quite practical for a requesting entity to run the CrowdRank algorithm (the methods 600 and 700) multiple times, with different parameter settings, during a single analysis session, to determine an optimal setting for a given campaign (optimality will depend on the type and size of targets sought, image resolution, participating user experience, and so forth).

Description of User Interface Embodiments

Figure 8:
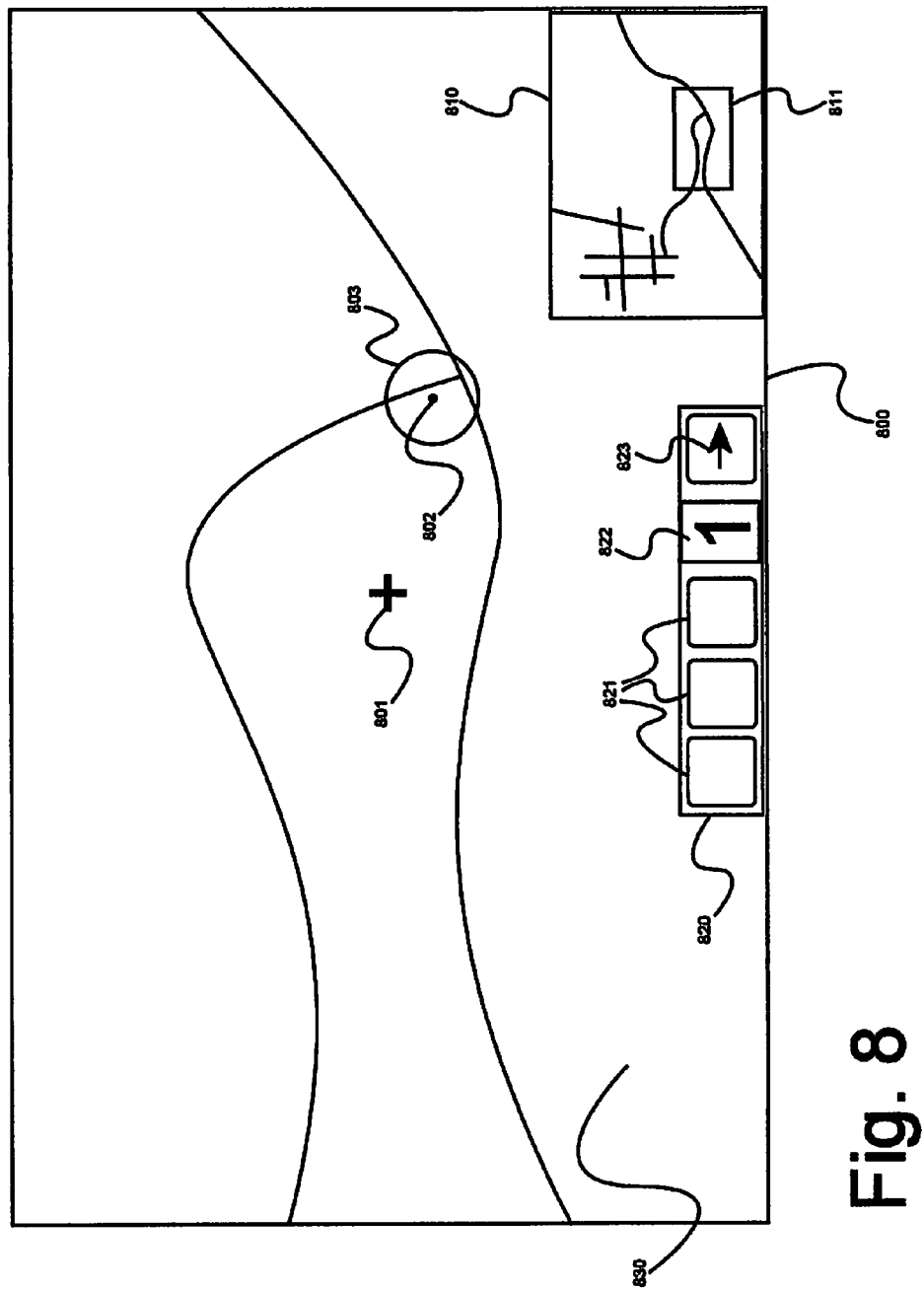
FIG. 8 is an illustration of an exemplary user interface for tagging objects in a crowdsourced image analysis platform of the invention.

FIG. 8 is an illustration of an exemplary user interface 800 for tagging objects in a crowdsourced image analysis platform of the invention. Interface 800 is used by participating users to view images and tag objects in them according to method 500. The interface comprises a main image 830, usually of high resolution, obtained in step 503 of method 500. Superimposed on main image 830 may be a navigation image 810, from which image 830 is drawn (for illustration, image 830 corresponds to sub-image 811 of navigation image 810). Thus, where a user is able in step 503 to "self-navigate", they may do so by clicking on a location in navigation image 810 in order to select that area for generation of a new sub-image 811, which is then displayed as main image 830. As noted above, in some campaigns users will not be allowed to self-navigate, and in such cases navigational image 810 may be omitted. Displayed within or closely associated with image 830 may be one or several icons or labels 821 for use in tagging; such icons may be collected within a toolbox object 820 to provide a cleaner user interface. Toolbox 820 and/or icons or labels 821 may be arranged as shown within the field of image 830 (typically at the bottom center, as shown, although they may be shown anywhere within image 830 according to the invention, and may be repositionable by participating users), or they may be shown as a side bar, top ribbon bar, or bottom ribbon bar outside of but closely visually associated with image 830. Icons 821 may be different for different crowdsourced image analysis campaigns. Examples of typical tagging tools that may be provided for use via icons 821 (and optionally or alternatively via conventional menu systems, whether pull-down from a menu bar or context sensitive menus invoked with a mouse, typically via a right-click) may include, but are not limited to, tag types (such as "tank", "airplane", "debris field", "campfire", "plane", "building", and so forth), or tagging tools (such as a polygon tool for drawing a polygon over some portion of image 830 to select it, or a vector tool for drawing line segments in image 830, as for following and tagging a road manually). Indicia 822 may be provided to indicate a number of other tags that are in agreement with a tag selected by or made by a participating user. According to a preferred embodiment of the invention, a user, when viewing image 830 and participating in a crowdsourced image analysis campaign, will be provided a cursor 801 which can be positioned as desired within image 830 (typically, using either a pointing device such as a mouse or a touch screen). A participating user will typically move cursor 801 over a target of interest, and tag that target. Tag type may be determined a user's first selecting one of icons 821 to indicate a tag type (such as by selecting a "campsite" icon), so that the user may then click or select when cursor 801 is placed over what the user believes is a campsite; alternatively, the user may position cursor 801 over a target of interest and then right click (or equivalent) to reveal a context-sensitive tagging menu which may have a plurality of tag types and tag tools accessible for use. In some embodiments, users are provided the ability to select an icon from a toolbar and drag it onto a map location where the user wishes to tag an object of the type indicated by the icon. When a user does this, the selected icon may be used for tagging the desired object, and afterward the same icon will appear below as an icon 821 for future use (allowing a user to dynamically adjust toolbar 820; similarly, a user may select an icon 821 and request that it be deleted from toolbar 820). When a user makes a tag by moving cursor 801 over a target of interest (such as at point 802) and creating a tag there, circle 803 may be displayed indicating a nominal object radius (this may, in some embodiments, be preferably set equal to the first specific distance used in method 600, or alternatively to the closeness parameter used in method 700, although it may be arbitrarily assigned without regard to either in some embodiments. Circle 803 may not always be made visible to users, but even if not made visible, it will typically still be used to determine how many other tags exist (made by others) within circle 803 (that is, within the radius of circle 803 from point 802 where the user has placed a tag); this "number of tags in agreement" computation can then be displayed in counter 822. Action button or icon 823 may be provided, either within toolbar 820 as shown or separately, to allow to move to a next image for tagging. Button 823 may be labeled with an arrow (as shown), or may display appropriate text (such as "Next"); a similar button for "Done" may also be provided, although completion may also be indicated simply by a user's navigating away from the interface of FIG. 8, which as discussed above is typically provided in a web browser. Note that, depending on the settings for a particular campaign, a user may be automatically navigated away from image 830 to a subsequent image, either when the user presses "Next", or after a timeout (in some cases, a requesting entity might not want users spending more than a certain amount of time on any one image 830). Alternatively, again depending on campaign settings, a user may choose to navigate entirely by using navigational map 810. In some embodiments of the invention, a user may select and drag a tag (of their own) in image 830 to reposition it. This may occur, for example, if a centroid of the tags made by others is displayed on image 830 (which is of course optional). It may also occur, for example, if a user starts by keeping image 830 fully zoomed out while initially tagging objects, then continues by zooming in for more precise positioning of each tag (by dragging them to more precise locations manually). Thus it should be apparent that the interface shown in FIG. 8 provides a simple, intuitive user interface to allow participating users to carry out the process of method 500.

Figure 9:
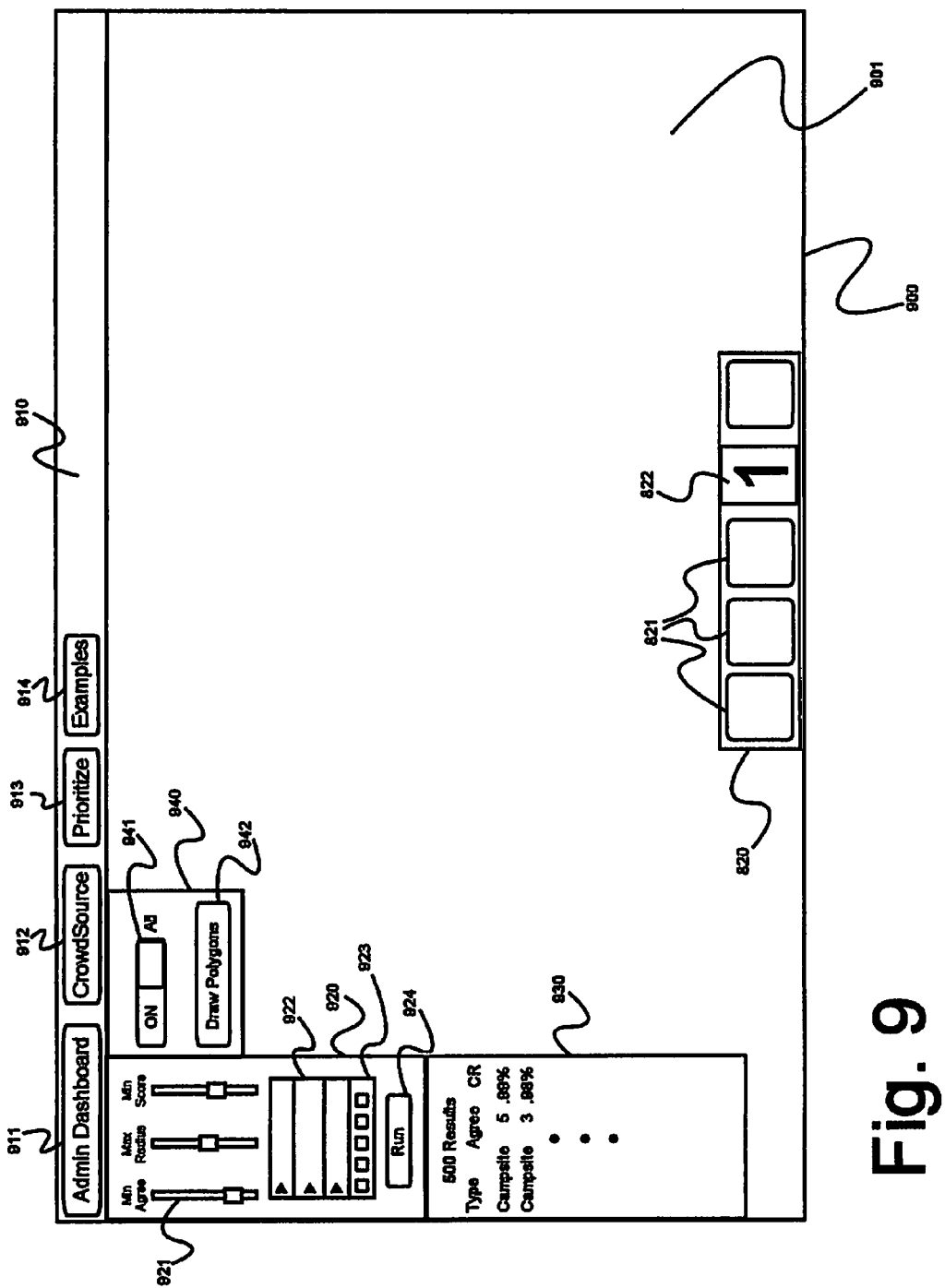
FIG. 9 is an illustration of an exemplary user interface for administrative users of a crowdsourced image analysis platform of the invention.

FIG. 9 is an illustration of an exemplary user interface 900 for administrative users, and particularly for users of a requesting entity, of a crowdsourced image analysis platform 400 of the invention. Interface 900 may used, for example, to set up the configuration of a new crowdsourced image analysis campaign. For example, the selection of icons 821 can be selected by a requesting entity or administrative user by dragging and dropping from a palette (not shown) of available icons onto toolbar 820 while setting up a new campaign. Only icons 821 selected by a requesting entity or administrative user will then be available to participating users (via interface 800) when they participate in the respective campaign. Toolbar 910 may also be provided in interface 900 to allow requesting entity users to select from among various types of campaign management activities; it will be appreciated by one having ordinary skill, of course, that various alternative ways of displaying various core categories of activities, such as tabs or menu selections, any of which may be used according to the invention. Exemplary tabs or categories may include administrative dashboard 911, where core settings and configuration options for using platform 400 may be set, crowdsourcing management 912, where campaign-specific details may be specified, prioritization 913, where graphical means may be provided to indicate relative priorities of different image areas or segments, and examples management 914, where positive and negative examples may be configured that will be used to train or assess participating users in a campaign. When crowdsourcing 912 is selected by a user, an image 901 may be displayed (and alternatively a navigational map 810 may also be shown to allow the user to navigate between images 901). Campaign settings panel 920 also appears (although it may optionally be minimized when desired by users, as in general all panels or popups may be) in crowdsourcing management mode 812. Campaign settings panel 920 may comprise a plurality of slide bar parameters 921, of which common examples are shown (specifically, "minimum agreement", which specifies the minimum number of taggers who must agree before a tag is considered by the CrowdRank method of FIGS. 6 and 7; "maximum radius", which is the radius used for circle 803; and "minimum score", which is the minimum probability score used in step 704; it should be understood that any other numerical parameters used in platform 400 may also be settable using slide bars 921). A plurality of expandable topic or menu buttons 922 may also be provided, which when expanded may expand to reveal a set of checkable boxes. Examples of uses of expandable topic or menu buttons 922 may include "Overlays", where a plurality of configured image overlays may be activated (checked) or deactivated (unchecked); "tagger groups", where a list of available tagger groups may be displayed so they may be enabled (checked) or disabled (unchecked) to participate in the campaign being configured; and "MTurk Campaigns", where available Mechanical Turk campaigns may be activated (checked) or deactivated (unchecked). It should be understood that any number of list-based selection items of a similar nature may be provided in box 922 according to the invention. A plurality of toggle-type checkboxes may be provided in box 923, such as "use priors", "save", "overwrite", and the like. Finally, campaign management panel 920 may comprise a "Run" button 924 that, when activated, initiates the processes of FIGS. 6 and 7, the results of which are then displayed in a CrowdRank results box 930. CrowdRank box 930 typically displays the total number of tags remaining after the clustering of method 700, and a list of the resulting object identifications (tags) in numerical order based on their probability of being correct. While variations are certainly possible according to the invention, a common approach (as shown) is to display the type ("campsite", "tank", etc.), the number of taggers who tagged the object, and the probability or confidence rating CR. In a preferred embodiment, a user may click or select one of the tags in results box 930, in order to cause the selected tag to be highlighted in its location on image 901 (and possibly also on navigational map 810, so if the tag selected is outside of the geographical range of image 901 it may be located on map 810 and the user may view the appropriate image segment by clicking on the tag in map 810). In some embodiments, it is possible to select multiple tags in box 930 (using any of the many multiple selection user interface paradigms known in the art) to cause the selected set of tags to be highlighted in image 901 (and possibly in map 810). Because a user can vary parameters such as minimum agreement, maximum radius, minimum score, and the like in box 920, and then rerun the CrowdRank algorithm by clicking Run button 924, it is easy for users to iteratively select a workable parameter set (for instance, by changing the radius parameter and observing how the number of tags changes, with larger radius likely resulting in fewer tags of higher confidence, and lower radius resulting in the opposite effects). When the Prioritize button 913 is selected, priority management box 940 appears, whereby a user is enabled to draw polygons using "Draw Polygons" button 942, or to activate (or deactivate) all polygons using toggle switch 941. Priority polygons may be drawn around regions of one or more images to specify areas that should be emphasized (or ignored) during crowdsourced image analysis. Regions in activated polygons of high priority are given a higher dwell time (i.e., they are shown more frequently to participating users to build up a higher tag base); conversely, regions in activated polygons of "ignore" priority are not shown (and optionally also cannot be navigated to by users themselves). This straightforward prioritization scheme allows a requesting entity user to prioritize the crowdsourcing efforts by emphasizing or ignoring promising (or known to be useless) image regions. For example, if one is looking for campsites, it does not make sense to have users examine lakes for them. Similarly, if one is looking for tents in a refugee situation, it makes sense to emphasize areas close to roads and streams. Finally, selection of the Examples button 914 enables a requesting entity user to specify either positive examples or "Easter eggs" by carrying out the same actions a participating user would take when tagging a target. That is, if a requesting entity user wants to highlight some known targets and to use them for training, he can select the appropriate icon 821 and tag the desired location. Similarly, if it is desirable to specify a region where it is known that there are no targets at all, this can be done using a polygon drawing tool accessed via icons 821, and specifying that the corresponding region is a "null zone"; any tags made by participating users in this zone will be strong indications of either malicious behavior or a training problem to address. Additionally, "Easter eggs" are false positives that can be placed explicitly by a requesting entity user to test the thoroughness of users. For example, if a campaign is focused on finding a downed plane, a clear image of a real plane can artificially be added to the image in a given location. Presumably every participating user who views that image segment will tag the "fake" plane, so it provides good accuracy (is it tagged accurately) and thoroughness (did it get tagged at all) check on participating users. It should be clear that, by using interface 900, a requesting entity user is provided with a number of important tools for setting up, monitoring, and viewing the results of a crowdsourced image analysis campaign.

Figure 10:
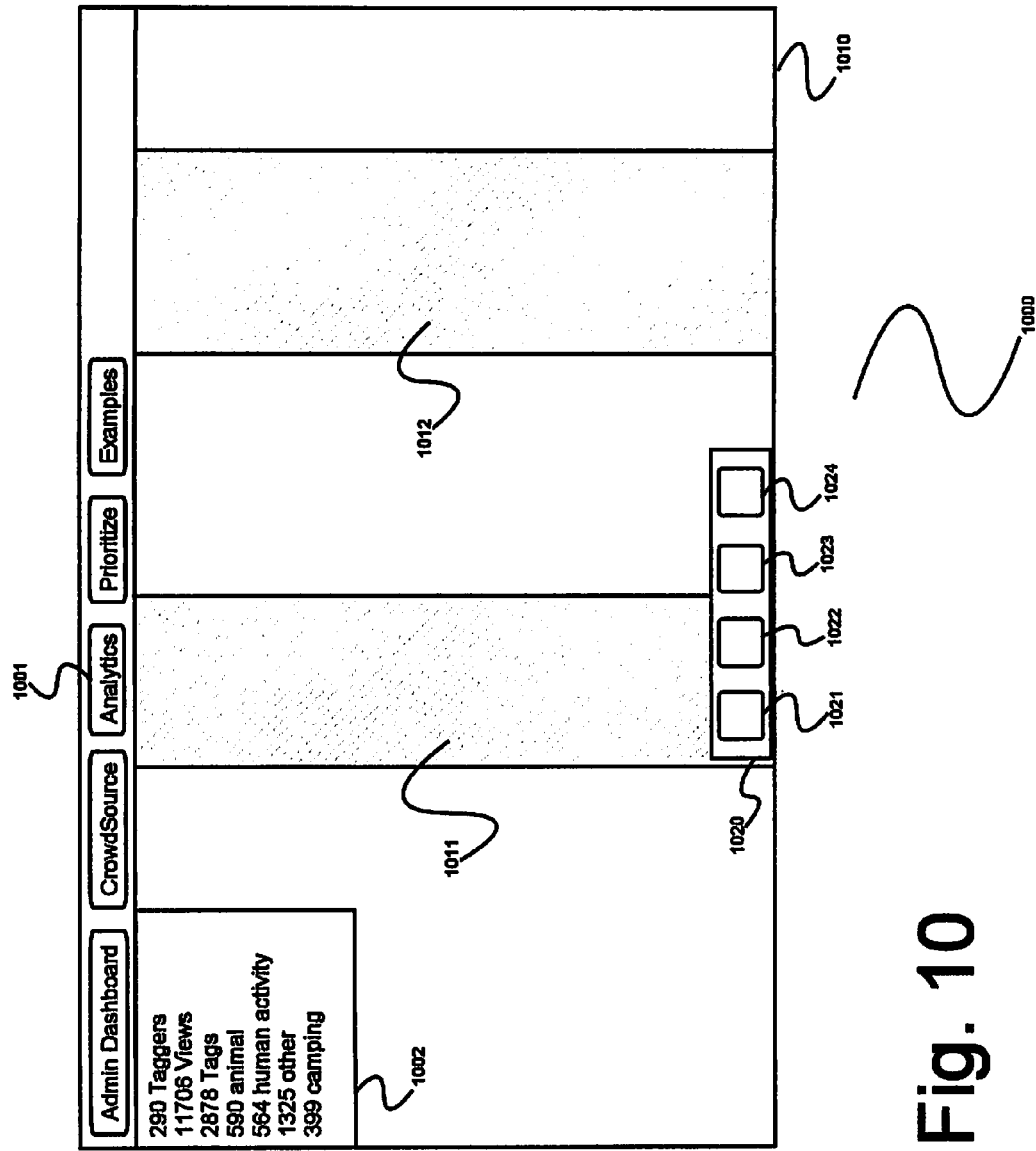
FIG. 10 is an illustration of en exemplary user interface for reviewing and analyzing results from a crowdsourced search and locate campaign, according to an embodiment of the invention.

According to various embodiments of the invention, interface 900 may also be used by requesting entity users to review results of a crowdsourced image analysis campaign, for example by viewing an image 901 with some or all user-generated tags visible. In such uses, FIG. 10 is an illustration of en exemplary user interface 1000 for reviewing and analyzing results from a crowdsourced search and locate campaign, according to an embodiment of the invention. According to the embodiment, a plurality of image strips 1011-1012 is displayed, arranged according to their actual geographical orientation relative to each other, in a geographical display region 1010. As before, various icons 1021-1024 are made available in toolbar 1020 at the bottom of interface 1000 for use in displaying tagged objects in image strips 1011-1012 in display region 1010. In the example shown, icon 1021 is for tagging campsites, icon 1022 is for the user to obtain help, icon 1023 is for tagging elephants, and icon 1024 is for tagging humans (this exemplary set being taken, for example, from a crowdsourced search and locate campaign for identifying poachers in East Africa). Interface 1000 is made visible when a user of the dashboard or administrative interface described above with reference to FIG. 9 selects analytics tab 1001. Accordingly, when analytics tab 1001 is selected, pop up box 1002 is displayed (it may be relocated as desired by users), displaying various data such as the number of taggers that participated in a particular crowdsourced search and locate campaign, the number of image views presented to the various participating users (i.e., taggers), the number of tags entered by the participating users as a result of viewing those images by the participating users, and the number of tags entered of specific types. Typically, a user may select an icon such as the campsite icon 1021, and all campsite tags will be displayed in their appropriate locations within image strips 1011-1012, allowing a user to identify and resolve conflicts, or to make use of the output of the crowdsourced search and locate campaign being analyzed. For example, in the case of elephant poaching, an administrative user could use interface 1000 to identify highly likely campsite tag clusters that are located close to highly likely people tag clusters, in order to direct law enforcement personnel in their search for poachers. Even better, they might identify high confidence clusters of elephant tags in proximity to such people tags, and direct not only law enforcement personnel, but for example personnel capable of inducing the at risk elephants to move to a safer location.

The skilled person will be aware of a range of possible modifications of the various embodiments described above. Accordingly, the present invention is defined by the claims and their equivalents.

What is claimed is:

1. A crowdsourced search and locate platform, comprising:
an application server computer comprising at least a memory and a processor coupled to a digital packet network
and programmable instructions stored in the memory and operable in the processor to provide a client interface application wherein the instructions are adapted to a crowdsourced search and locate platform comprising:
  a first list of geolocations corresponding to a plurality of crowdsourced participants stored in a database;
  a second list of geolocations corresponding to images stored in the database;
wherein the client interface application:
  sends images to crowdsourced participants wherein the corresponding geolocation of the second list is substantially the same as the geolocation of the first list;
  receives tagging data from the crowdsourced participants, the tagging data corresponding to a plurality of objects and locations identified by the crowdsourced participants;
  displays a first plurality of elements enabling an administrative user to configure a crowdsourced search and locate campaign;
  displays a second plurality of elements enabling an administrative user to configure and run a crowdrank algorithm, wherein the crowdrank algorithm takes as input a large number of object tags created by participating users in the crowdsourced search and locate campaign and determines a most likely distribution of actual locations of objects of interest;
  displays a plurality of image strips that were viewed by participating users in the crowdsourced search and locate campaign; and
  upon the user's selecting a particular object type icon, displays all or a substantial portion of tags of the type selected that were generated by participating users in the crowdsourced search and locate campaign, by placing visual indicators at each tagged location of objects of the selected type within the plurality of image strips;
wherein the crowdrank algorithm performs the steps of:
  computing a vector of agreement and disagreement values for each of the plurality of retrieved tags, wherein each agreement or disagreement value is determined by comparing a distance between a location associated with a first retrieved tag with which a first vector is associated and a location associated with a second retrieved tag; and
  automatically performs an expectation-maximization or expectation-minimization process iteratively until a configured maximum number of iterations is performed or until an indicia of rate of change between iterations falls below a configured threshold.

2. A method for conducting crowdsourced search and locate operations, the method comprising:
  an application server computer comprising at least a memory and a processor coupled to a digital packet network and programmable instructions stored in the memory and operable in the processor, the instructions adapted to a crowdsourced search and locate operation comprising the steps of:
  (a) receiving, at the application server computer, a first list of geolocations corresponding to a plurality of crowdsourced participants;
  (b) receiving, at the application server computer, a second list of geolocations from a plurality of images;
  (c) navigating the first list of geolocations corresponding to crowdsourced participant to a specific geospatial location;
  (d) sending a first image to a first crowdsourced participant wherein the geolocation of the second list corresponding to the first crowdsourced participant, the geolocation of the second list being substantially the same to the geolocation of the first list corresponding to the first image;
  (e) receiving tagging data from the first crowdsourced participant, the tagging data corresponding to a plurality of objects and locations identified by the first crowdsourced participant;
  (f) displaying, on a client computer comprising at least a memory, a processor, and programmable instructions, the programmable instructions stored in the memory and operable in the processor to provide a client interface application, a first plurality of elements enabling an administrative user to configure a crowdsourced search and locate campaign;
  (g) displaying, on the client computer, a second plurality of elements enabling an administrative user to configure and run a crowdrank algorithm, wherein the crowdrank algorithm takes as input a large number of object tags created by participating users in the crowdsourced search and locate campaign and determines a most likely distribution of actual locations of objects of interest;
  (h) displaying, on the client computer, a plurality of image strips that were viewed by participating users in the crowdsourced search and locate campaign; and
  (i) upon the user's selecting a particular object type icon, displaying, on the client computer, all or a substantial portion of tags of the type selected that were generated by participating users in the crowdsourced search and locate campaign, by placing visual indicators at each tagged location of objects of the selected type within the plurality of image strips;
wherein the crowdrank algorithm performs the steps of:
  computing a vector of agreement and disagreement values for each of the plurality of retrieved tags, wherein each agreement or disagreement value is determined by comparing a distance between a location associated with a first retrieved tag with which a first vector is associated and a location associated with a second retrieved tag; and
  automatically performs an expectation-maximization or expectation-minimization process iteratively until a configured maximum number of iterations is performed or until an indicia of rate of change between iterations falls below a configured threshold.

* * * * *